United States Patent [19]
Burgdorf

[11] 4,354,716
[45] Oct. 19, 1982

[54] HYDRAULIC BRAKE-ACTUATING DEVICE

[75] Inventor: Jochen Burgdorf, Offenbach-Rumpenheim, Fed. Rep. of Germany

[73] Assignee: ITT Industries, Inc., New York, N.Y.

[21] Appl. No.: 205,551

[22] Filed: Nov. 10, 1980

[30] Foreign Application Priority Data

Dec. 1, 1979 [DE] Fed. Rep. of Germany ....... 2948428

[51] Int. Cl.$^3$ .......................... B60T 13/14; B60T 8/02
[52] U.S. Cl. ...................................... 303/119; 303/50
[58] Field of Search ............................... 303/113–119, 303/68–69, 61–63, 92, 50–56, 6; 188/181, 151 A, 358–360; 60/582

[56] References Cited

U.S. PATENT DOCUMENTS

| | | | |
|---|---|---|---|
| 3,891,278 | 6/1975 | Grossean | 303/119 |
| 4,120,540 | 10/1978 | Devlieg | 303/117 |

FOREIGN PATENT DOCUMENTS

2307817 8/1974 Fed. Rep. of Germany .

OTHER PUBLICATIONS

ATE Brake Handbook, pp. 32-33.

*Primary Examiner*—Douglas C. Butler
*Attorney, Agent, or Firm*—John T. O'Halloran; Alfred C. Hill

[57] ABSTRACT

Known brake actuating devices include a pressure source and a valve arrangement operated by a brake pedal with the pressure fluid being fed by the valve arrangement to a control chamber which has as one of its boundaries a pressure piston acting on a master cylinder piston. The pressure piston of the known device is operated mechanically by the brake pedal upon failure of the pressure fluid supply. However, the brake pedal travel is increased in so doing. According to the present invention the control chamber has a second piston forming a boundary thereof opposite the pressure piston which keeps a pressure fluid channel open between the control chamber and the valve arrangement in the normal operating condition and closes the pressure fluid channel during failure of the pressure fluid supply so that the pressure piston is operated by the second piston without any appreciable increase in brake pedal travel.

27 Claims, 1 Drawing Figure

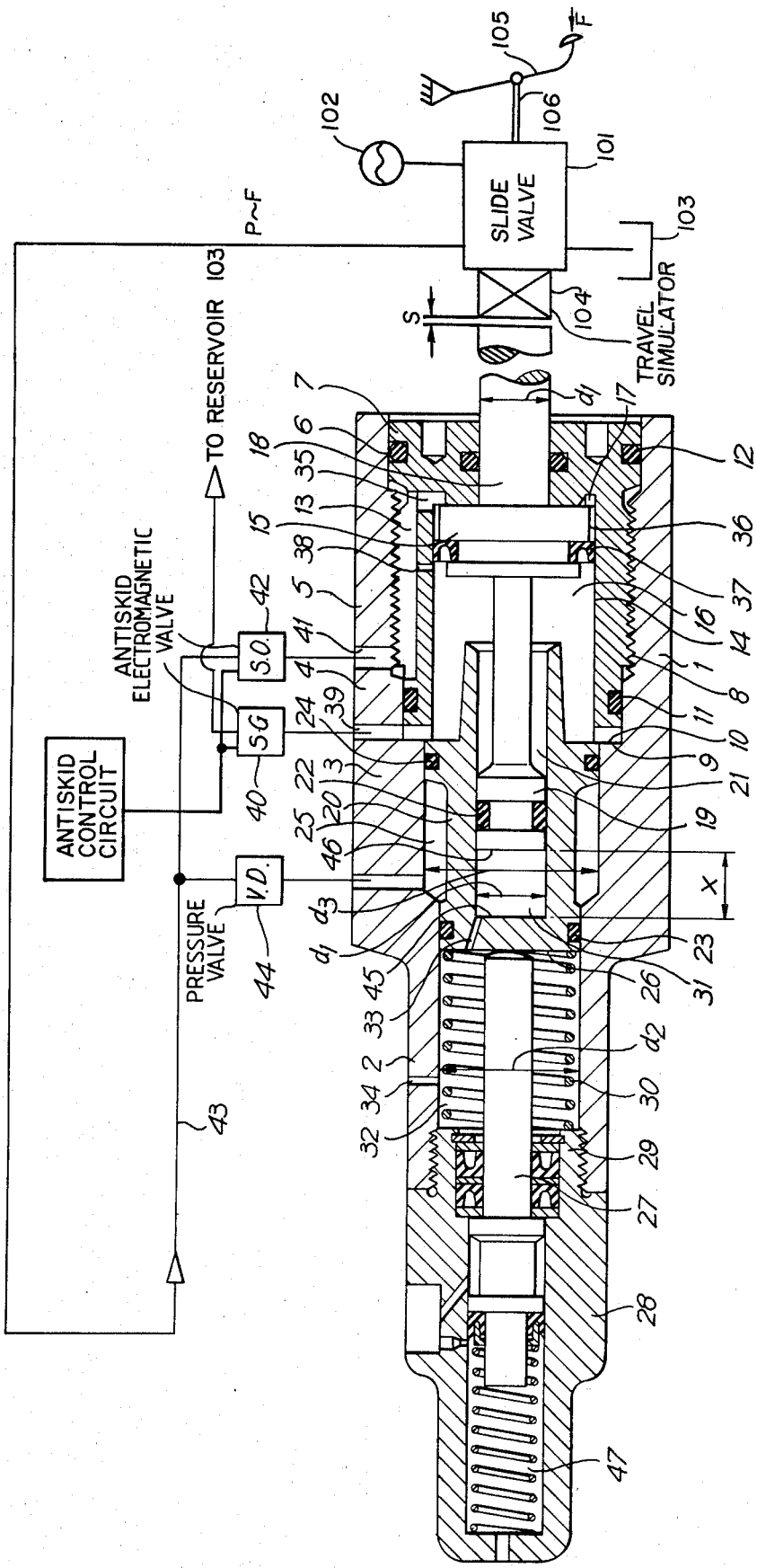

HYDRAULIC BRAKE-ACTUATING DEVICE

BACKGROUND OF THE INVENTION

The present invention relates to a hydraulic brake-actuating device, in particular for vehicles with an antiskid control unit, comprising a pressure fluid source and a valve arrangement to be controlled by the brake pedal, the pressure fluid being fed via a regulating valve arrangement to a control chamber, which is bounded by a pressure piston acting on a master cylinder piston, with the pressure piston being adapted to be operated by the brake pedal without pressure fluid being supplied by the pressure fluid source.

With regard to such brake-actuating devices the experts are confronted with the problem of providing an emergency device for a brake unit actuated hydraulically which permits applying the brakes upon failure of the hydraulic actuating circuit.

A brake-actuating system of the aforementioned type is known from German Patent DE-OS No. 2,307,817. The valve arrangement includes two pistons, the first one of the two pistons sliding in a bore of the second one of the two pistons. The second piston is in mechanical connection with the pressure piston of a hydraulic actuating device. The pressure piston is mechanically connected with the master cylinder piston. When the controlled pressure fluid is introduced, the pressure piston will lift from the second piston of the valve arrangement and actuate the master cylinder. Due to this, the controlled pressure actuating the pressure piston will also act on the second piston of the valve arrangement. With the application of the maximum auxiliary force, the pressure piston will be spaced a considerable distance from the mechanical abutment with the second piston so that upon failure of the pressure in the hydraulic pressure fluid circuit the first piston has to be urged into mechanical abutment with the second piston of the valve arrangement for the initial braking to be continued. This requires a considerable brake pedal travel, thus causing the positioning of the brake pedal to be adjusted to this type of emergency. Consequently, considerable structural space is wasted in the interior of the vehicle due to the location of the brake pedal, since the other actuating elements of the vehicle have to be arranged on the level of the brake pedal, too. In addition, an unfavorable sitting position results for the driver in case of very long brake pedal travels.

The lost travel until the master cylinder piston is mechanically actuated is particularly prejudicial to the so-called dual-circuit cylinder arrangements. Both master cylinders have to be mechanically actuated by the brake pedal, when the pressure in the hydraulic pressure fluid circuit fails. If it is the case that the pressure pistons of the two master cylinder arrangements are differently positioned, dependent on the pressure control of an antiskid control unit, differing lost travels will have to be overcome until both pressure pistons mechanically abut when the pressure fails in the hydraulic pressure circuit. This may have a result that with the pressure piston being unfavorably positioned only one master cylinder builds up the necessary pressure in case of an emergency braking, whereas the pressure build-up in the second master cylinder ensues only with a deceleration. A considerably longer braking operation results from this situation. The emergency braking may furthermore be endangered by a canting of the mechanical actuating device. Upon a normal mechanical actuation, the second piston and the actuating rod are in force balance with the two pressure pistons when a force is transmitted. If only one pressure piston is abutted, a torque is exerted on the piston arrangement of the valve arrangement, which leads to a blocking of the mechanical actuating device. An emergency braking is impossible in this situation.

SUMMARY OF THE INVENTION

An object of the present invention is to provide a brake-actuating device in which the lost travel is reduced to a minimum in case of an emergency operation.

A feature of the present invention is the provision of a hydraulic brake-actuating device for vehicles having an antiskid unit comprising a source of pressure fluid; a housing containing therein a control chamber defined on one side thereof by a pressure piston acting on a master cylinder piston and a valve arrangement disposed between the source and the control chamber controlled by a brake pedal to couple pressure fluid from the source to the control chamber, the pressure piston being operated by the brake pedal when the source fails; an additional piston disposed in the control chamber spaced from the pressure piston; and a pressure fluid connection from the source to the control chamber controlled by the additional piston, the connection being open when the additional piston is in a given inactive position and the connection being closed when the additional piston moves from the inactive position.

Such an arrangement ensures that the pressure fluid in an intact device may any time act on the pressure piston. If, however, the pressure fails in the hydraulic pressure fluid circuit, the piston is displaced by the actuating rod and the connection is closed for the circulation of pressure fluid from the first to the second pressure chamber. Thus, hydraulic fluid with an invariable volume will prevail in the control chamber. The pressure piston can be continued to be subjected to pressure by the added piston, no matter what position the pressure piston had occupied upon failure of the pressure fluid circuit. Only a minimum travel has to be overcome at the brake pedal when the pressure fluid circuit fails. The driver will note the failure of the pressure fluid circuit by the greater force he has to apply to the brake pedal. Since there is no substantial difference between the brake pedal's emergency operating position and its normal operating position, the driver is allowed in his usual sitting position to apply the required force to the brake pedal.

A valve arrangement is placed in the pressure fluid connection and is kept open by the added piston when the latter is in its inactive position.

In a particularly advantageous embodiment the control chamber is subdivided by a piston in a first pressure chamber, bounded by the pressure piston, and a second pressure chamber, bounded by the housing, and the pressure fluid which circulates from the valve arrangement to the second pressure chamber is fed to the first pressure chamber through a pressure fluid connection in which a non-return valve is inserted, the added piston in its defined inactive position keeping a connection open for the pressure fluid to circulate from the first to the second pressure chamber. Thus, it is possible to close the connection for a circulation of pressure fluid by the added piston moving a comparatively small amount from its inactive position. The diameter of this connection may be a very small one, since the necessary volume circulation is effected by the non-return valve in an antiskid control system. It is the sole object of this connection to ensure that the pressure in the control chamber may be reduced when the unit is in the rest position.

A simple construction of a connection for the circulation of pressure fluid from the first to the second pressure chamber is provided in that the added piston keeps the non-return valve open when it is in its inactive position. If the non-return valve is arranged in an axial opening in the added piston and the connection for a circulation of pressure fluid from the first to the second pressure chamber is located in the wall of the control chamber, known structural elements may be used which do not have to meet high demands. The added piston itself can be used as a simple closing member for the connection, causing the connection to be closed when the piston moves from its inactive position. No additional seal is necessary, if the added piston is sealed in the control chamber by means of a lip seal, which closes the connection when the piston moves from its inactive position. In addition, the opening in the added piston may be closed by the lip seal and form the non-return valve. Such an embodiment allows the use of known elements of a conventional master cylinder.

The openings in the added piston are advantageously grooves, which are axially arranged around its circumference. Thus, the openings are defined by the grooves and the wall of the control housing when the added piston is installed therein. In an advantageous embodiment the added piston has a projection protruding from the housing in a sealed relation, which can be brought into mechanical communication with the brake-actuating rod through a slide valve and a travel simulator. If the added piston in the control chamber is created so as to be pressure-balanced, no force reactions will result on the added piston when the control of an antiskid system is used. This may be easily achieved by providing the added piston with a second projection sliding in a sealed relation in the pressure piston. The second projection sliding in a sealed relation in the pressure piston is of like diameter as the first projection protruding from the housing. When the end surface of the second projection being axially spaced from the pressure piston, even with a maximum movement of the added piston the pressure piston can be moved corresponding to the antiskid control unit. A direct mechanical connection with the brake pedal is ensured when the lip seal fails.

The inflow of pressure fluid to the second pressure chamber and an outflow of pressure fluid from the first pressure chamber is controlled by electromagnetic valves, which are actuated in accordance with controlling signals generated by the antiskid control unit. If the pressure piston is subjected to the pressure of the pressure fluid, metered by the valve arrangement, opposite to the actuating direction, an active reverse movement of the pressure piston may be achieved with an antiskid control unit. From the technical point of view, this is easily accomplished in that the pressure piston is a stepped piston which is subjected to the pressure fluid on an annular surface.

In order to avoid that the control is influenced too much by a similar annular surface, the annular surface is subjected to the pressure fluid which is led through a throttle. Thus, it is ensured that a correspondingly rapid pressure build-up is caused in the assigned master cylinder when the brakes are applied. Only after the pressure has been prevailing in front of the pressure piston for a longer period of time will the corresponding pressure on the annular surface of the pressure piston be built up via the throttle opposite to the actuating direction.

BRIEF DESCRIPTION OF THE DRAWING

The above-mentioned and other features and objects of the present invention and the manner of obtaining them will become more apparent by reference to the following description taken on conjunction with the drawing, the single FIGURE of which is a longitudinal cross view of a brake-actuating device in accordance with the principles of the present invention.

DESCRIPTION OF THE PREFERRED EMBODIMENT

Referring to the FIGURE, the housing of the brake actuating device includes a tube 1 having sections 2 to 6 which have different internal diameters. The internal diameters of the individual sections increase from section 2 to section 6. Tube 1 is closed by a plug 7 which is located in the three sections 4, 5 and 6. Plug 7 is rigidly screwed into section 5 by means of a thread 8, with the depth plug 7 enters tube 1 being predetermined by the edge 9 of plug 7 abutting step 10 between section 4 and section 3. Plug 7 is sealed to sections 4 and 6 by means of the sealing elements 11 and 12. The pressure inlet chamber 13 in section 5 of tube 1, which has been provided in the circumference of plug 7 by an axial groove, is sealed by elements 11 and 12 from the atmosphere and the inside of tube 1.

Plug 7 has an axial bore opening into the inner chamber of tube 1. This axial bore forms the control chamber 14 which is subdivided by a piston 15 into a first pressure chamber 16 and a second pressure chamber 17. First pressure chamber 16 is bounded by a pressure piston 20, which is constructed as a stepped piston and slides in sections 2 and 3 in a sealed relation. Piston 15 has a projection 18, which protrudes from plug 7 in a sealed relation and which can communicate mechanically with the brake pedal through a travel simulator 104, a slide valve 101 and actuation rod 106. Slide valve 101, which may also take the form of a seal valve, controls the coupling of line 43 to a pressure source 102 or to an unpressurized return reservoir 3 dependent upon the operation of brake pedal 105. Slide valve 101 includes a sliding element to control the operation of the valve connected between actuating rod 106 and travel simulator 104 which may take the form of a spring assembly or a rubber reaction disc. Travel simulator 104, upon application of the brake, produces a specific reaction force at brake pedal 105 so that the operator is given a feedback or reaction concerning the intensity of the braking action caused by him. During normal operation, a distance "s" is present between travel simulator 104 and projection 18. When pressure source 102 fails, the force in actuating rod 106 will be transmitted mechanically onto piston 15 as a result of travel simulator 104 abutting against the adjacent end of piston 8.

A further projection 19 of piston 15 enters into a coaxially arranged bore 21 in pressure piston 20. Projection 19 is sealed by means of a sealing element 22 axially slidably in bore 21. The diameters of projections 18 and 19 are of equal size so that piston 15 has the same effective surface in pressure chambers 16 and 17.

Since stepped piston 20 is in its inactive position close to step 10 and slides in sections 2 and 3 through the sealing elements 23 and 24, a pressure chamber 25 is created in section 3 between the outer surface of pressure piston 20, the internal wall of tube 1 and elements 23 and 24.

The end surface 26 of pressure piston 20 abuts a piston 27 of a master brake cylinder 28 in section 2. The master brake cylinder 28 has a threaded shoulder 29, with which master cylinder 28 is screwed into section 2. A spring 30, bearing against the shoulder 29 of master brake cylinder 28, acts on front surface 26 of pressure piston 20 and urges pressure piston 20 into the inactive position close to step 10 as shown in the drawing.

To permit the movement of the singular pistons in their guides and towards each other, the chamber 31 of bore 21, which is bounded by seal 22, will be connected via an opening 33 with the inner chamber 32 of section 2, with chamber 32 being connected with the atmosphere via an opening 34.

Chambers 13, 16 and 17 which are filled with pressure fluid are interconnected by means of a special channel system. To allow an unhindered circulation of pressure fluid from pressure inlet chamber 13 to second pressure chamber 17, radial bores 35 are provided in plug 7. The circulation of pressure fluid from second pressure chamber 17 to first pressure chamber 16 is first of all achieved by means of axial openings 36 at the level of the lip seal 37, which seals piston 15 in control chamber 14. These openings are preferably created by grooves axially arranged around the outer circumference of piston 15. Openings 36, which are closed by lip seal 37, have the effect of non-return valves, since they permit the circulation of pressure fluid only from the second pressure chamber 17 to the first pressure chamber 16. For the circulation of pressure fluid from first pressure chamber 16 to second pressure chamber 17 or to pressure inlet chamber 13, a radial bore 38 is provided in plug 7 in the form of a compensation port. Bore 38 is located axially directly in front of lip seal 37 in first pressure chamber 16 when piston 15 is in its inactive position.

Pressure chamber 16 communicates with a compensating tank or reservoir, such as reservoir 103, via an opening 39 and an electromagentic valve 40. Via the opening 41 and the electromagnetic valve 42 pressure inlet chamber 13 is in communication with the line 43, which couples the pressure fluid from a valve arrangement to the brake-actuating device. Via a pressure valve 44 the pressure fluid chamber 25 is connected with line 43. Valve 44 may be the special pressure valve described and illustrated at pages 32 and 33 of the ATE Brake Handbook. Valve 44 serves to delay the pressure build-up in chamber 25 upon brake application with respect to the pressure in line 43. When the brake is applied quickly, the counteracting force of piston 20 that acts in the direction of brake release will thereby be retained at a low value at first. A compensation port provided in valve 44 serves to completely discharge the pressure in chamber 25 in the position of brake release.

Prior to dealing with the mode of operation, some remarks shall be made with regard to the actuation of a valve arrangement and the mechanical connection between projection 18 and the brake pedal 105. A distinction has to be made between two essential ways of operation.

Piston 15 can be coupled with a pressure-controlling valve arrangement such that projection 18 has to be moved axially via the brake pedal to control the valve arrangement. For this case, the bottom or closed end 45 of bore 21 has a distance x to the front or end surface 46 of projection 19, which corresponds to the brake pedal travel predetermined upon hydraulic actuation by a reaction mechanism. When the brake-actuating device is supplied with the maximum auxiliary force, pressure piston 20, controlled by valves 40 and 42, may return to its shown inactive position in order to release the assigned master cylinder 28, without pressure piston 20 mechanically abutting piston 15.

The second case is represented by piston 15 staying inactive during normal operation and being urged in mechanical connection with the brake pedal via projection 18 when the pressure fluid circuit building up the force fails.

The mode of operation of the illustrated device is as follows.

Piston 15 remains in the inactive state upon normal hydraulic delivery of the controlled pressure fluid when the brake pedal 105 is actuated. This is accomplished as follows: The pressure fluid is fed to pressure chamber 13 via line 43 from valve 101, open electromagnetic valve 42 and opening 41. Via bore 35, the pressure fluid flows into second pressure chamber 17, from which the fluid can flow to first pressure chamber 16 through openings 36 past lip seal 37. Similarly, the pressure fluid may circulate from pressure inlet chamber 13 through compensation port 38 to pressure chamber 16. However, the largest part of the pressure fluid by volume is supplied to first pressure chamber 16 via openings 36. Piston 15 is constructed such that the effective cross section in first pressure chamber 16, which is exposed to the pressure, is equal the effective cross section in second pressure chamber 17. Consequently, piston 15 is pressure-balanced and remains in its inactive state.

The pressure in first pressure chamber 16 acts on the effective surface of pressure piston 20 defined by $(d_3^2 - d_1^2) \cdot \pi/4$. This pressure will displace pressure piston 20 in the direction of master cylinder 28 and in doing so, will displace master cylinder piston 27.

The force thus acting on master cylinder piston 27 will build up the required brake pressure in the pressure chamber of master cylinder 28. When the braking operation is completed, the pressure in first pressure chamber 16 will be reduced via compensation port 38 only, since lip seal 37 now closes opening 36.

In case of an antiskid control unit detecting an impending wheel lock-up during a braking operation, it may reduce the pressure by means of valves 40 and 42 and adjust it again. In order to accelerate the reaction of pressure piston 20 upon a designated reduction of the brake pressure, pressure chamber 25 is in communication with line 43 of the pressure circuit via pressure valve 44. This way a pressure force acts in the brake-releasing direction on an annular surface, which is defined according to $(d_3^2 - d_2^2) \cdot \pi/4$. Thus, pressure piston 20 is actively moved backward.

If the hydraulic pressure fluid circuit 43 fails because of a defect, projection 18 will be mechanically connected with the brake pedal 105 as described above after a certain brake pedal travel equal to "s" plus the distance to close compensation port 38 has been overcome, which determines the auxiliary force. Piston 15 is now being moved forward past the compensation port 38, so that first pressure chamber 16 is separated from the defective pressure fluid circuit. The hydraulic fluid with an invariable volume now prevails in chamber 16 and transmits the pedal force to piston 20 so that an emergency braking can be initiated. The advantage of this device becomes still more obvious, if the failure of the hydraulic pressure fluid circuit occurs during a braking operation. Assuming that a maximum force is applied, pressure piston 20 will be moved a considerable distance in the direction of master cylinder 28. In case the hydraulic pressure fluid circuit 43 now fails, the pressure in first pressure chamber 16 will be reduced very slowly via compensation port 38, a closed valve 40 being presupposed. Having already pushed the brake pedal until attainment of the supply of the maximum auxiliary force, the driver is already in a position of a force-transmitting connection with piston 15. With the braking effect declining, the driver will depress the brake pedal with increased force. However, the brake pedal travel will be increased at this time insignificantly. After having overridden compensation port 38, which requires only an insignificant brake pedal travel, the driver may continue with the braking operation, but now applying considerably more force. It is obvious that a considerable brake pedal travel can be reduced due to the comparatively simple construction of the device, i.e. sufficient brake travel is available to the driver for an emergency braking.

While I have described above the principles of my invention in connection with specific apparatus it is to be clearly understood that this description is made only by way of example and not as a limitation to the scope of my invention as set forth in the objects thereof and in the accompanying claims.

I claim:

1. A hydraulic brake-actuating device for vehicles having an antiskid unit comprising:
   a source of pressure fluid;
   a housing containing therein a control chamber defined on one side thereof by a pressure piston acting on a master cylinder piston and a valve arrangement disposed between said source and said control chamber controlled by a brake pedal to couple pressure fluid from said source to said control chamber, said pressure piston being operated by said brake pedal when said source fails;
   an additional piston disposed in said control chamber spaced from said pressure piston; and
   a pressure fluid connection from said source to said control chamber controlled by said additional piston, said connection being open when said additional piston is in a given inactive position and said connection being closed when said additional piston moves from said inactive position.

2. An actuating device according to claim 1, wherein said valve arrangement is disposed in said connection, said valve arrangement being open when said additional piston is in said inactive position.

3. An actuating device according to claim 1, wherein said additional piston divides said control chamber into a first pressure chamber adjacent said pressure piston and a second pressure chamber adjacent a closed end of said housing,
   said connection includes first and second passageways between said first and second chambers, and
   said valve arrangement including a non-return valve disposed in a selected one of said first and second passageways to enable flow of said pressure fluid only from said second chamber to said first chamber, said additional piston opening the other of said first and second passageways when said additional piston is in said inactive position to enable flow of said pressure fluid from said first chamber to said second chamber.

4. An actuating device according to claim 3, wherein said non-return valve is opened when said additional piston is in said inactive position.

5. An actuating device according to claim 3, wherein said one of said first and second passageways is an axial opening through said additional piston adjacent the wall of said control chamber, and
   said other of said first and second passageways is a radial opening through said wall of said control chamber.

6. An actuating device according to claim 5, wherein said radial opening is closed by said additional piston moving from said inactive position.

7. An actuating device according to claim 6, wherein said additional piston is sealed to said wall of said control chamber by said valve arrangement in the form of a lip seal which closes said radial opening when said additional piston moves from said inactive position.

8. An actuating device according to claim 7, wherein said lip seal provides said non-return valve in said axial opening.

9. An actuating device according to claim 8, wherein said axial opening includes axial grooves disposed in the outer surface of said additional piston distributed about the circumference thereof.

10. An actuating device according to claim 9, wherein
    said additional piston includes a first axial projection extending from one surface thereof adjacent said closed end of said housing extending through said closed end in a sealed relationship thereto.

11. An actuating device according to claim 10, wherein
    said pressure piston is hollow, and
    said additional piston includes a second axial projection extending from the other surface thereof into said hollow pressure piston in a slidably sealed relationship therewith.

12. An actuating device according to claim 11, wherein
    said first and second projections are dimensioned to cause said additional piston to be pressure balanced.

13. An actuating device according to claim 11, wherein
    the end of said second projection remote from said additional piston is spaced a given distance from an adjacent end of said pressure piston.

14. An actuating device according to claim 13, wherein
    the flow of said pressure fluid in said control chamber is controlled by a pair of electromagnetic valves controlled by control signals of said antiskid unit.

15. An actuating device according to claim 14, wherein
    said pressure piston is acted upon by said pressure fluid in a direction opposite to an actuating direction through a valve connected to said source.

16. An actuating device according to claim 15, wherein
    said pressure fluid is coupled through said valve to act on an annular surface of said pressure piston spaced from and facing away from said control chamber.

17. An actuating device according to claim 1, wherein said additional piston includes a first axial projection extending from one surface thereof adjacent a closed end of said housing extending through said closed end in a sealed relationship thereto.

18. An actuating device according to claim 17, wherein
said pressure piston is hollow, and said additional piston includes a second axial projection extending from the other surface thereof into said hollow pressure piston in a slidably sealed relationship therewith.

19. An actuating device according to claim 18, wherein
said first and second projections are dimensioned to cause said additional piston to be pressure balanced.

20. An actuating device according to claim 18, wherein
the end of said second projection remote from said additional piston is spaced a given distance from an adjacent end of said pressure piston.

21. An actuating device according to claim 20, wherein
the flow of said pressure fluid in said control chamber is controlled by a pair of electromagnetic valves controlled by control signals of said antiskid unit.

22. An actuating device according to claim 21, wherein
said pressure piston is acted upon by said pressure fluid in a direction opposite to an actuating direction through a valve connected to said source.

23. An actuating device according to claim 22, wherein
said pressure fluid is coupled through said valve to act on an annular surface of said pressure piston spaced from and facing away from said control chamber.

24. An actuating device according to claim 1, wherein
the flow of said pressure fluid in said control chamber is controlled by a pair of electromagnetic valves controlled by control signals of said antiskid unit.

25. An actuating device according to claim 24, wherein
said pressure piston is acted upon by said pressure fluid in a direction opposite to an actuating direction through a valve connected to said source.

26. An actuating device according to claim 25, wherein
said pressure fluid is coupled through said valve to act on an annular surface of said pressure piston spaced from and facing away from said control chamber.

27. An actuating device according to claim 1, wherein said additional piston is pressure balanced.

* * * * *